W. H. McMillan.
Oar.

No. 1,766. Reissued Sep. 13, 1864.

Witnesses.

Jas R. Hall

Geo H. Reed

Inventor.

W. H. McMillan

UNITED STATES PATENT OFFICE.

W. H. McMILLAN, OF NEW YORK, N. Y.

IMPROVED OAR.

Specification forming part of Letters Patent No. 42,389, dated April 19, 1864; Reissue No. 1,766, dated September 13, 1864.

*To all whom it may concern:*

Be it known that I, W. H. McMILLAN, of the city, county, and State of New York, have invented a new and useful Improvement in Oars; and I do hereby declare that the following is a full, clear, and exact description of the same, which will enable others skilled in the art to make and use it, reference being had to the accompanying drawings, making a part of this specification, in which—

Figure 1:
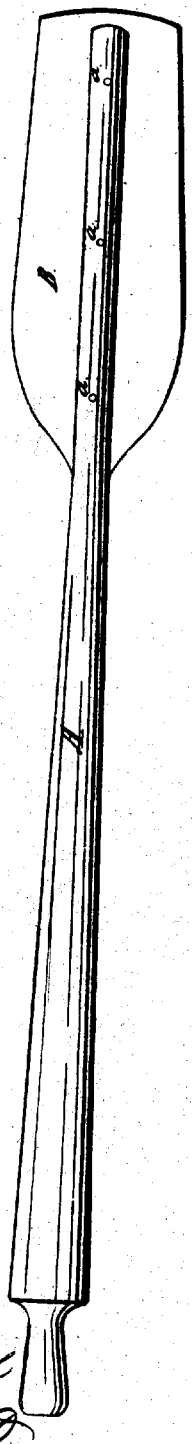
Figure 2:
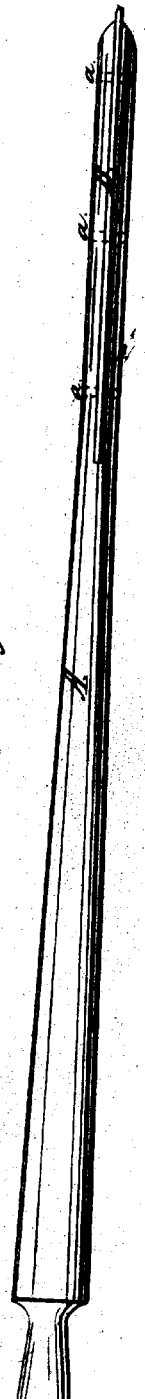

Figure 1 represents a front elevation of my invention. Fig. 2 is a side elevation of the same.

Similar letters of reference indicate corresponding parts.

This invention consists in an oar having its blade attached to the handle by splitting the latter and inserting said blade into the kerf thus formed in such a manner that the handle and the blade can be made separate out of wood or metal, and when combined and fastened they produce a strong and durable oar.

A represents the handle of my oar, which is made of wood in the usual manner and shape, but independent of the blade B. That end of the handle which is intended to receive the blade is split open or provided with a kerf, into which said blade can be inserted. The blade may either be made of sheet-iron, steel, copper, or any other suitable metal; or, in cases where a metal blade is too heavy, it can be cut out of wood and fastened in the kerf of the handle by means of rivets *a*; or, if desired, clasps might be employed together with the rivets to embrace that portion of the handle extending over the blade and to prevent it from splitting.

By making the handle and the blade separate the manufacture of the oar is considerably simplified. With an ordinary oar, the blade and handle of which are cut out of a solid piece of wood, the waste of wood is immense, since it requires a large block to cut out the blade, and this block must be worked down to the proper size of the handle. If the handle and the blade are made separate, the former can be easily turned out of a piece of wood not much thicker than the thickest part of the handle, and the blade can be easily sawed out, so that a block of wood which will make only one oar when the blade and handle are made solid will make three oars when the same are manufactured according to my invention.

When the handle and the blade are made of tough wood, they can be readily connected by splitting the handle as above specified, and an oar can be produced not less durable than an oar of the ordinary construction; and if the blade of my oar splits or breaks, it can be easily replaced without throwing away the handle, whereas when the blade of an ordinary oar breaks the whole thing, handle and all, becomes useless.

In some cases, however, it is desirable to use metal blades instead of wood. In rough weather wood-bladed oars are liable to be lifted out of the rowlocks by the wind and heavy sea; but that trouble is overcome by the thin and heavy metallic blade, which can be easily placed in the water in a heavy sea, and can also be made extra wide for smooth water rowing without the liability to split.

I claim as new and desire to secure by Letters Patent—

An oar made in separate pieces of any suitable material or materials and connected together substantially as herein described.

W. H. McMILLAN.

Witnesses:

M. M. LIVINGSTON,

WM. F. McNAMARA.